US011238095B1

(12) United States Patent
Burchard

(10) Patent No.: US 11,238,095 B1
(45) Date of Patent: Feb. 1, 2022

(54) DETERMINING RELATEDNESS OF DATA USING GRAPHS TO SUPPORT MACHINE LEARNING, NATURAL LANGUAGE PARSING, SEARCH ENGINE, OR OTHER FUNCTIONS

(71) Applicant: Goldman Sachs & Co. LLC, New York, NY (US)

(72) Inventor: Paul Burchard, Jersey City, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 488 days.

(21) Appl. No.: 16/135,176

(22) Filed: Sep. 19, 2018

Related U.S. Application Data

(60) Provisional application No. 62/560,300, filed on Sep. 19, 2017.

(51) Int. Cl.
  *G06F 40/205* (2020.01)
  *G06F 16/903* (2019.01)
  *G06F 16/901* (2019.01)

(52) U.S. Cl.
  CPC ........ *G06F 16/9024* (2019.01); *G06F 40/205* (2020.01); *G06F 16/903* (2019.01)

(58) Field of Classification Search
  CPC .... G06F 16/9024; G06F 16/35; G06F 16/322; G06F 16/9027; G06F 40/14; G06F 40/211; G06F 40/205
  USPC .......................... 707/755, 798, E17.012, 797
  See application file for complete search history.

(56) References Cited

U.S. PATENT DOCUMENTS

| | | | |
|---|---|---|---|
| 6,751,614 B1* | 6/2004 | Rao | G06F 16/355 |
| 6,987,511 B2* | 1/2006 | Taubin | G06T 17/20 |
| | | | 345/420 |
| 8,838,519 B2* | 9/2014 | Hively | G06N 20/00 |
| | | | 706/50 |
| 10,162,868 B1* | 12/2018 | Zappella | G06F 16/2465 |
| 2005/0071251 A1* | 3/2005 | Linden | G06Q 30/0256 |
| | | | 705/14.54 |
| 2005/0278325 A1* | 12/2005 | Mihalcea | G06F 16/3344 |

(Continued)

OTHER PUBLICATIONS

Ranjan et al., "Incremental Computation of Pseudo-Inverse of Laplacian", Apr. 2013, 25 pages.

(Continued)

*Primary Examiner* — Robert W Beausoliel, Jr.
*Assistant Examiner* — Pedro J Santos

(57) ABSTRACT

An apparatus includes at least one processor configured to obtain a graph having vertices that represent items and edges that represent relationships between the items. The at least one processor is also configured to identify pairwise relatedness values associated with pairs of vertices. Each pairwise relatedness value is determined as a measure of diffusion on a space in the graph with a first vertex acting as a diffusion source and a boundary acting as a diffusion sink such that a diffusion density at a second vertex defines the pairwise relatedness value associated with the first and second vertices. The at least one processor is further configured to use the pairwise relatedness values as a measure of how the items associated with the pairs of vertices in the graph are related to one another. A boundary condition defines the boundary on the space in the graph around the diffusion source.

25 Claims, 9 Drawing Sheets

(56) References Cited

U.S. PATENT DOCUMENTS

2013/0339352 A1* 12/2013 Jin .................. G06Q 10/047
                                                  707/736

OTHER PUBLICATIONS

Chung et al., "Discrete Green's functions", Journal of Combinatorial Theory, Series A, vol. 91, Issue 1-2, Jul. 2000, 22 pages.
Kook, "Combinatorial Green's function of a graph and applications to networks", Advances in Applied Mathematics, 2010, 7 pages.
Cao et al., "PyNetSim: Freely Available Python Package to Generate Network-based Similarity", Manual, Jul. 2014, 11 pages.
Nickel et al., "A Review of Relational Machine Learning for Knowledge Graphs", Sep. 2015, 23 pages.
"Omnity.io Semantically Maps Documents in 100+ Languages to Enable Multilingual Research & Discovery", PRNewswire, Dec. 2016, 2 pages.

* cited by examiner

DETERMINING RELATEDNESS OF DATA USING GRAPHS TO SUPPORT MACHINE LEARNING, NATURAL LANGUAGE PARSING, SEARCH ENGINE, OR OTHER FUNCTIONS

CROSS-REFERENCE TO RELATED APPLICATION AND PRIORITY CLAIM

This application claims priority under 35 U.S.C. § 119(e) to U.S. Provisional Patent Application No. 62/560,300 filed on Sep. 19, 2017. This provisional application is hereby incorporated by reference in its entirety.

TECHNICAL FIELD

This disclosure relates generally to machine learning systems and other computing systems. More specifically, this disclosure relates to determining the relatedness of data using graphs to support machine learning, natural language parsing, search engine, or other functions.

BACKGROUND

Various machine learning techniques and other computing techniques generate or use graphs, which typically include (i) vertices representing items and (ii) edges connecting the vertices and representing relationships between the items. For example, natural language parsers can be used to generate syntax trees, where vertices in the syntax trees represent words or phrases and edges connecting the vertices represent relationships between the words or phrases. As another example, expert systems can be used to generate knowledge graphs, where vertices in the knowledge graphs represent specific information and edges connecting the vertices represent relationships between the information.

SUMMARY

This disclosure provides determining the relatedness of data using graphs to support machine learning, natural language parsing, search engine, or other functions.

In a first embodiment, a computer-implemented method includes obtaining a graph having vertices that represent items and edges that represent relationships between the items. The method also includes, using at least one processor, identifying pairwise relatedness values associated with pairs of vertices in the graph. Each pairwise relatedness value is determined as a measure of diffusion on a space in the graph with a first vertex acting as a diffusion source and a boundary acting as a diffusion sink such that a diffusion density at a second vertex defines the pairwise relatedness value associated with the first and second vertices. The method further includes using, by the at least one processor, the pairwise relatedness values as a measure of how the items associated with the pairs of vertices in the graph are related to one another. Identifying the pairwise relatedness values includes using a boundary condition that defines the boundary on the space in the graph around the diffusion source, where vertices outside the boundary are assumed to have a pairwise relatedness value of zero with respect to the diffusion source.

In a second embodiment, an apparatus includes at least one processor configured to obtain a graph having vertices that represent items and edges that represent relationships between the items. The at least one processor is also configured to identify pairwise relatedness values associated with pairs of vertices in the graph. Each pairwise relatedness value is determined as a measure of diffusion on a space in the graph with a first vertex acting as a diffusion source and a boundary acting as a diffusion sink such that a diffusion density at a second vertex defines the pairwise relatedness value associated with the first and second vertices. The at least one processor is further configured to use the pairwise relatedness values as a measure of how the items associated with the pairs of vertices in the graph are related to one another. To identify the pairwise relatedness values, the at least one processor is configured to use a boundary condition that defines the boundary on the space in the graph around the diffusion source, where vertices outside the boundary are assumed to have a pairwise relatedness value of zero with respect to the diffusion source.

In a third embodiment, a non-transitory computer readable medium contains instructions that when executed cause at least one processor to obtain a graph having vertices that represent items and edges that represent relationships between the items. The medium also contains instructions that when executed cause the at least one processor to identify pairwise relatedness values associated with pairs of vertices in the graph. Each pairwise relatedness value is determined as a measure of diffusion on a space in the graph with a first vertex acting as a diffusion source and a boundary acting as a diffusion sink such that a diffusion density at a second vertex defines the pairwise relatedness value associated with the first and second vertices. The medium further contains instructions that when executed cause the at least one processor to use the pairwise relatedness values as a measure of how the items associated with the pairs of vertices in the graph are related to one another. The instructions that when executed cause the at least one processor to identify the pairwise relatedness values include instructions that when executed cause the at least one processor to use a boundary condition that defines the boundary on the space in the graph around the diffusion source. Vertices outside the boundary are assumed to have a pairwise relatedness value of zero with respect to the diffusion source.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
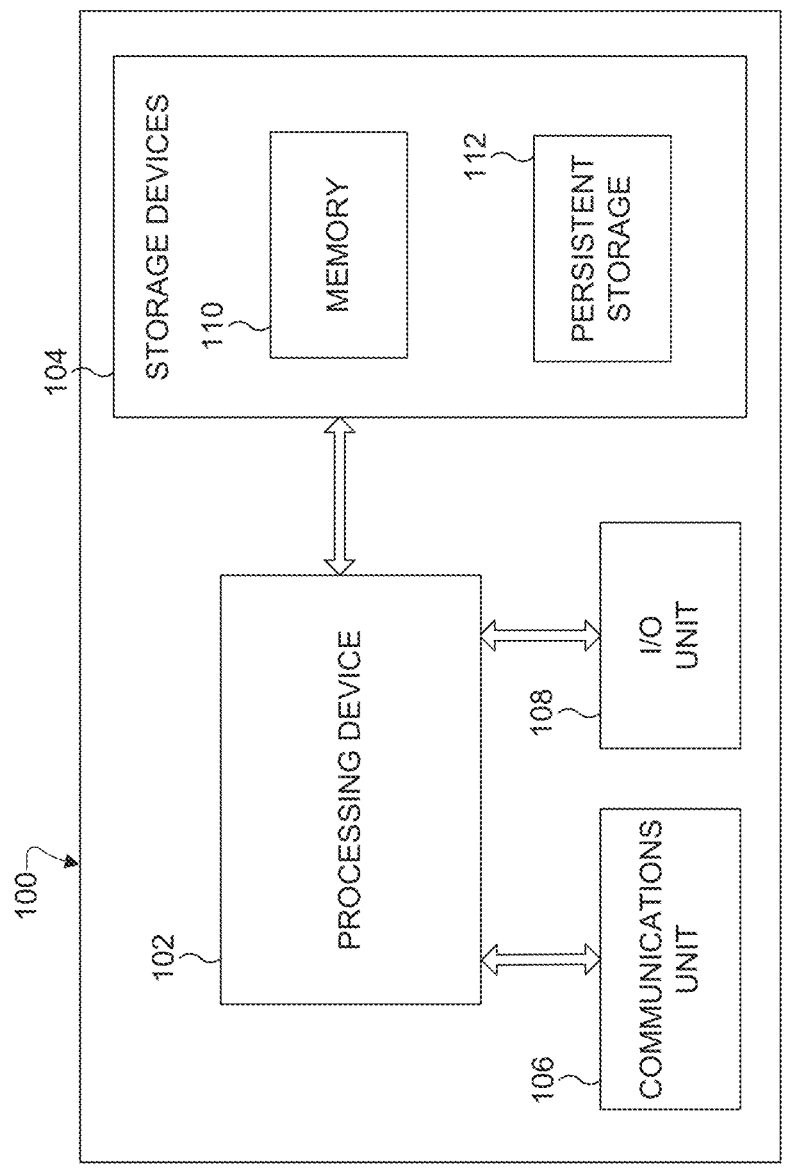
FIG. 1 illustrates an example device for determining the relatedness of data using a graph to support machine learning, natural language parsing, search engine, or other functions according to this disclosure.

FIGS. 1 through 12, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, various machine learning techniques and other computing techniques generate or use graphs. Each graph typically includes (i) vertices representing items and (ii) edges connecting the vertices and representing relationships between the items. Such graphs can be used in a wide variety of applications, such as in expert systems or other machine learning systems, natural language parsers, search engines, recommendation systems, risk management systems, and other systems.

While these types of systems can be effective, it may be difficult, slow, or burdensome to determine how two or more items represented in a graph are related. For example, a graph can be generated or otherwise obtained having thousands, hundreds of thousand, or millions of vertices, and it may be necessary or desirable to know how closely related various items represented by vertices in the graph are. For instance, in a natural language parser, a computing system may need to determine how words or phrases represented by vertices in a graph are related in order to determine the meaning of natural language phrases or sentences. As another example, in content-based searching, a computing system may need to determine which items represented by vertices in a graph are most closely related to one or more specific items, which are represented by one or more specific vertices in the graph. One particular example of this is in natural language searching, where a natural language query is parsed and the graph is searched to identify data items (represented by vertices) most closely related to the query (represented by one or more vertices). Another particular example of this is in online or automated document searches, where the text of one document (represented by one or more vertices) is used to identify data items most closely related to that document (represented by other vertices). As yet another example, in a recommendation system like for television shows or movies (such as a recommendation system for NETFLIX or HULU), a computing system may need to determine which movies or television shows, characters, actors, directors, plot devices, genres, or other related aspects (represented by vertices) are most closely related to one or more viewers or viewer preferences (represented by one or more vertices). The same approach could be used in other types of recommendation systems, such as for books, music, kitchenware, appliances, exercise equipment, outdoor items, vehicles, or any other suitable products or services. In general, "products or services" encompass anything that may be provided to a viewer or other user, including tangible goods and non-tangible goods (such as entertainment content). As still another example, in a financial risk management system, a computing system may need to determine how financial assets in a portfolio (represented by vertices) are related to possible future events that might adversely impact the value of those assets (represented by other vertices).

In applications such as these, a computing system may be required to determine or identify a relatedness value for each pair of items represented by vertices in a graph. This allows the computing system to identify more relevant relationships based on the edges connecting the vertices, thereby allowing more important or less important relationships to be identified. However, without any knowledge ahead of time, this can be a very time-consuming and processor-intensive process. Moreover, this can make it difficult if not impossible to easily calculate the relatedness values in real-time or to recalculate the relatedness values over time. This disclosure describes various techniques that allow for improved relatedness values to be determined for vertices/edges in a graph. Among other things, these techniques can be used to improve the speed and accuracy of functions such as machine learning, natural language parsing, search engine, or other functions.

FIG. 1 illustrates an example device 100 for determining the relatedness of data using a graph to support machine learning, natural language parsing, search engine, or other functions according to this disclosure. The device 100 could, for example, denote a computing device or system being used to implement machine learning algorithms, natural language parsing algorithms, search engine algorithms, or other computing algorithms. Specific examples of the device 100 include a desktop computer, laptop computer, server computer, tablet computer, or other computing device.

As shown in FIG. 1, the device 100 includes at least one processor 102, at least one storage device 104, at least one communications unit 106, and at least one input/output (I/O) unit 108. Each processor 102 can execute instructions, such as those that may be loaded into a memory 110. The instructions could implement part or all of the functionality described in this patent document for determining data relatedness using one or more graphs. Each processor 102 denotes any suitable processing device, such as one or more microprocessors, microcontrollers, digital signal processors (DSPs), application specific integrated circuits (ASICs), field programmable gate arrays (FPGAs), or discrete circuitry.

The memory 110 and a persistent storage 112 are examples of storage devices 104, which represent any structure(s) capable of storing and facilitating retrieval of information (such as data, program code, and/or other suitable information on a temporary or permanent basis). The memory 110 may represent a random access memory or any other suitable volatile or non-volatile storage device(s). The persistent storage 112 may contain one or more components or devices supporting longer-term storage of data, such as a read only memory, hard drive, Flash memory, or optical disc.

The communications unit 106 represents an interface that supports communications with other systems or devices. For example, the communications unit 106 could include a network interface card or a wireless transceiver facilitating communications over a wired or wireless network. The communications unit 106 may support communications through any suitable physical or wireless communication link(s). Note, however, that the use of the communications unit 106 may not be needed, such as when the device 100 processes data locally and does not need to engage in network communications.

The I/O unit 108 allows for input and output of data. For example, the I/O unit 108 may provide a connection for user input through a keyboard, mouse, keypad, touchscreen, or other suitable input device. The I/O unit 108 may also send output to a display, printer, or other suitable output device. Note, however, that the use of the I/O unit 108 for local I/O may not be needed, such as when the device 100 is accessible locally or remotely over a network connection.

Although FIG. 1 illustrates one example of a device 100 for determining the relatedness of data using a graph, various changes may be made to FIG. 1. For example, components could be added, omitted, combined, further subdivided, or placed in any other suitable configuration according to particular needs. Also, computing devices can come in a wide variety of configurations, and FIG. 1 does not limit this disclosure to any particular configuration of computing device.

Figure 2:
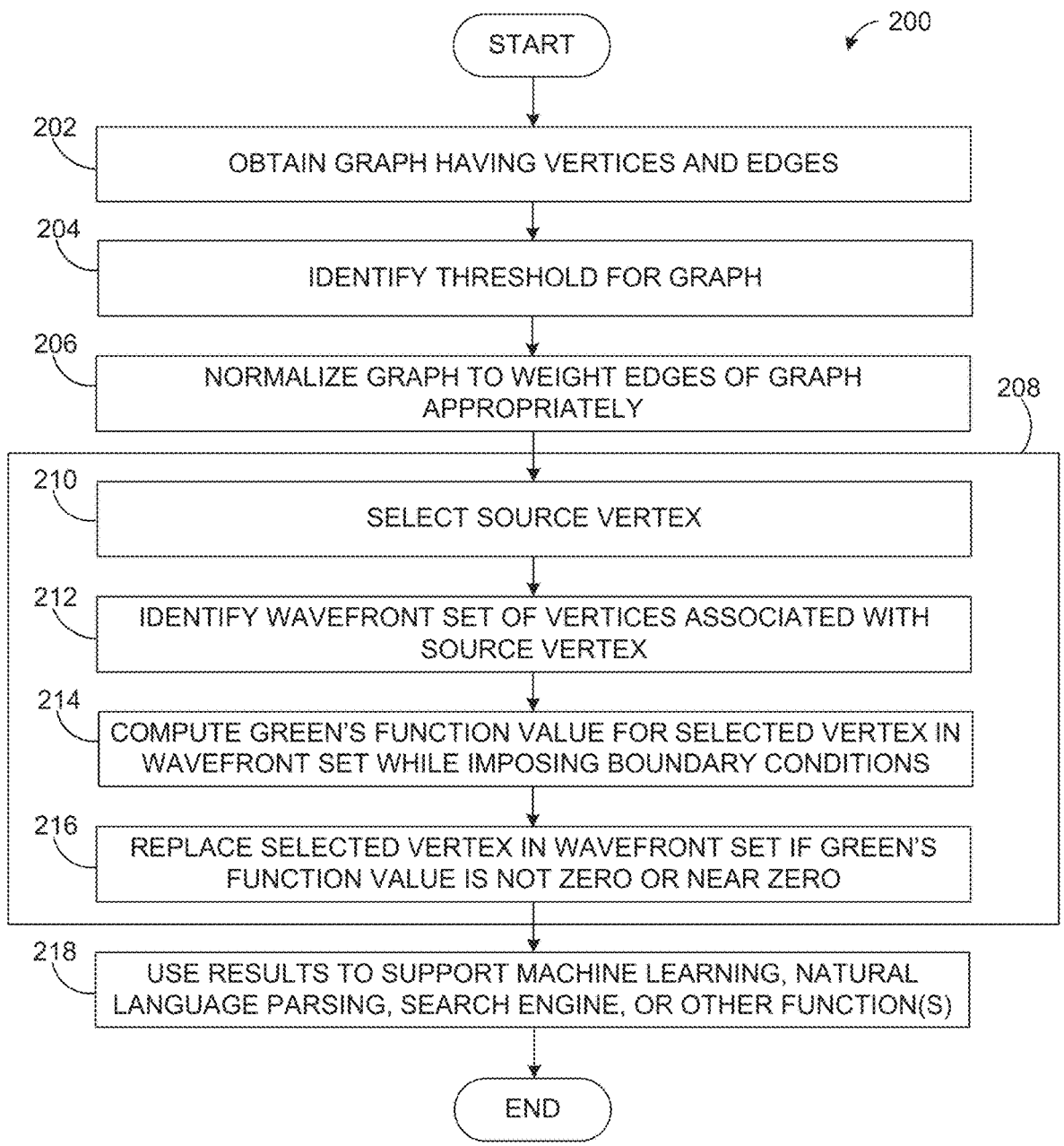
FIG. 2 illustrates an example method for determining the relatedness of data using a graph to support machine learning, natural language parsing, search engine, or other functions according to this disclosure.

FIG. 2 illustrates an example method 200 for determining the relatedness of data using a graph to support machine learning, natural language parsing, search engine, or other functions according to this disclosure. For ease of explanation, the method 200 is described as being performed using the device 100 of FIG. 1. However, the method 200 could be performed using any suitable device or devices, and the device or devices may operate in any suitable system. Also, the device 100 may be used to determine the relatedness of data to support any suitable applications, including those described in more detail below.

As noted above, this disclosure describes various techniques that allow for improved relatedness values to be determined for vertices/edges in a graph. In general, a geometric measure of relatedness for two points in a geometric space (such as a graph) can be obtained by looking at a diffusion process on the space, where a first point in the space is a source of the diffusion and a boundary of the space is a sink of the diffusion. A density of diffused particles at a second point in the space represents a measure of its relatedness to the first point. This relation naturally takes into account all paths that a particle could take between the first and second points, and this relation is symmetric for the two points. Mathematically, a measure of relatedness based on diffusion is known as the Green's function of a Laplacian of the space ("the Green's function" for simplicity). The symmetry is a result of the self-adjoint nature of the Laplacian. Efficient methods for computing the Green's function using finite differences are known in the art.

In order to use the Green's function for machine learning, natural language parsing, searching, or other computer-implemented functions, two modifications can be made to the Green's function. These modifications are used to practically handle graphs that arise naturally in such applications. Note, however, that one or both modifications may not be needed in particular applications.

The first modification involves defining the boundary of the space. In many cases, there is no natural boundary to serve as a sink of a diffusion for machine learning, natural language parsing, searching, or other computer-implemented functions. Without a boundary, the Green's function would be undefined. In accordance with this disclosure, a threshold referred to as an "evaporation rate" is imposed at a surface of a diffusion (outside of which the density is zero). Once a rate of diffusion of particles onto the surface becomes weak enough to exactly balance the evaporation rate, the surface stabilizes to form a dynamic boundary. Mathematically, this amounts to a dynamic boundary condition defined as a (to be determined) surface on which the density is zero and the normal derivative of the density equals some specified small value (the evaporation rate). Ideally, the boundary condition placed on the Green's function allows values of zero to be assigned to items in the graph that are not of interest with respect to the source vertex.

The second modification relates to the issue that, in some cases, the Green's function does a poor job of measuring what humans intuitively sense as relatedness. In a graph sense, this is due to a highly non-uniform degree of vertices of the graph. For example, due to Zipf's Law, some words in natural text are much more common than other words, such as "the" or "a" in the English language. The result is that a lot of the diffusion can travel through these high-degree vertices, even though these vertices (due to their generic nature) intuitively imply very little relation with the vertices to which they are connected.

In accordance with this disclosure, a graph can be normalized by weighting its edges to form a weighted graph. In some embodiments, for example, the graph can be normalized by weighting its edges using instructions that are stored in the storage device(s) 104 and executed by the processor(s) 102. Ideally, edge weights are assigned so that, for every vertex, some combination of the incident edge weights has a fixed value. For example, the $l^p$-norm of the incident edge weights at every vertex could be equal to one. In the particular case of p=1, this could simply require that the ordinary weighted degree of each vertex be one. This may not always be exactly possible. However, it is possible to make the combination always less than or equal to one, such as by setting the edge weight between vertices v and w to:

$$1/\max(\deg(v)^{1/p},\deg(w)^{1/p})$$

where deg(v) is the unweighted degree of v, deg(w) is the unweighted degree of w, and p is a positive number. It should be noted that the Green's function of a normalized graph is not the same thing as the Green's function of the so-called normalized Laplacian of the original graph. The latter suppresses high-degree vertices after the fact, without effectively suppressing the diffusion flow through them to other vertices.

For practical purposes, it may be necessary or desirable to avoid trying to compute the Green's function for every pair of vertices in a graph. In a graph with N vertices, for example, there are $N^2$ possible values of the Green's function, which may be too large a number for some computing systems. However, for pairs of vertices that are far apart, most of these Green's function values are either zero (due to an evaporative boundary condition) or close to zero (due to a fixed boundary). If those zero or near-zero values are ignored, the amount of work to compute the relevant values of the Green's function could be closer to N. Due to the varying weights of the edges in a graph, the cutoff for ignoring a pair of vertices may not simply be based on the number of edges to be traversed between those vertices. Long chains of highly-weighted edges could be relevant and used as necessary.

One technique for avoiding the computation of zero or near-zero values of the Green's function involves maintaining a "wavefront" set of vertices for which the Green's function for a given source vertex (i) has not yet been computed or (ii) is zero or close to zero but for which there is at least one adjacent vertex having a Green's function value that is not zero or close to zero. At each step, a vertex from the wavefront set is selected, and the Green's function for that vertex is computed (such as by applying a few steps of a finite-difference method), with boundary conditions being imposed as appropriate (such as by setting the value to zero if the derivatives at that vertex are smaller than the evaporation rate). If the resulting value is not zero or close to zero, the vertex is removed from the wavefront set and replaced in the wavefront set with its neighbors for which the Green's function value has not yet been computed or is still zero or close to zero. These steps can be repeated until there are no more eligible vertices in the wavefront.

Thus, as shown in FIG. 2, a graph can be generated or otherwise obtained at step 202. This can include, for example, the processor 102 receiving or generating a graph. This can also include storing the graph in the memory 110, persistent storage 112, or other storage device 104. The graph includes any suitable number of vertices representing items and any suitable number of edges connecting the vertices. The items represented by the vertices can vary depending on the application. For instance, in a machine learning application, the items represented by the vertices can include knowledge or other data. In a natural language parsing application, the items represented by the vertices can include words and phrases. In a search engine application, the items represented by the vertices can include words and phrases used in websites, documents, or other content or the websites, documents, or other content itself. The graph can be generated in any suitable manner, including any techniques known in the art or later developed. For instance, there are various algorithms known in the art for generating graphs in various fields, including machine learning, natural language parsing, and other fields.

A threshold for the graph is identified at step 204. This can include, for example, the processor 102 identifying an evaporation rate stored in the memory 110, persistent storage 112, or other storage device 104 or obtained from a user or other source. The evaporation rate could be set by a user, set by default or tuned (such as for a given application), or identified in any other suitable manner. As noted above, the evaporation rate can be used to define a dynamic boundary during the computation of diffusion values (Green's function values) involving vertices in the graph. Any vertices outside the dynamic boundary can be ignored or assigned a diffusion value of zero with respect to a source vertex associated with the diffusion.

The graph can be normalized to weight the edges of the graph appropriately at step 206. This can include, for example, the processor 102 assigning weights to the edges of the graph so that, for every vertex, a combination of the incident edge weights has a fixed value (such as less than or equal to one). As a particular example, the edge weight between each pair of vertices v and w can be set using the equation as described above. At this point, the graph has been weighted so that edges with less important vertices (such as those representing "the" or "a" in the English language during natural language processing) have lower weights, while edges with more important vertices have higher weights. Of course, the weights can be reversed so that edges with lower weights correspond to more important vertices. Also, in other embodiments, weighting of the graph's edges may not be needed, such as when it is unlikely that vertices having high degrees provide little useful information.

Pairwise relatedness values are computed for different pairs of vertices in the graph generally during step 208. This can include, for example, the processor 102 calculating Green's function values for different pairs of vertices in the graph. In particular embodiments, this overall step could occur as follows. The processor 102 can select a specific source vertex at step 210. The source vertex can be selected in any suitable manner, such as randomly, in response to specific input (like a natural language query or other user input data), or in any other suitable manner. A wavefront set of vertices associated with the selected source vertex can be identified at step 212. This can include, for example, the processor 102 identifying any neighboring vertices of the source vertex for which a Green's function value has not been computed. This can also include the processor 102 identifying any neighboring vertices of the source vertex that have (i) a zero or near-zero Green's function value and (ii) at least one adjacent vertex not having a zero or near-zero Green's function value. A vertex in the wavefront set is selected, and the Green's function value for that selected vertex is computed with respect to the source vertex at step 214. This can include, for example, the processor 102 computing the Green's function value for a randomly-selected vertex or other vertex within the wavefront set with respect to the source vertex. During this calculation, boundary conditions are imposed as appropriate, such as by setting the Green's function value of the selected vertex to zero if the derivative at that vertex is smaller than the evaporation rate. The selected vertex in the wavefront set is replaced if its Green's function value is not zero or near-zero at step 216. This can include, for example, the processor 102 inserting into the wavefront set any neighboring vertices of the selected vertex for which a Green's function value has not been computed. This can also include the processor 102 inserting into the wavefront set any neighboring vertices of the selected vertex that have (i) a zero or near-zero Green's function value and (ii) at least one adjacent vertex not having a zero or near-zero Green's function value.

Steps 210-216 can be repeated until all members of the wavefront set have a zero or near-zero Green's function value and no more neighboring vertices can be added to the wavefront set. This completes the calculation of the Green's function values for one vertex in the graph acting as the source vertex. Depending on the application, in some embodiments, this process can be repeated any number of times to identify Green's function values for more or all possible source vertices. In other embodiments, there may only be a need to calculate the Green's function values with one vertex or a small number of vertices as the source vertex, so these calculations may not repeat or may be repeated a small number of times.

In any event, the results here can be used to support machine learning, natural language parsing, search engine, or other function(s) at step 218. The specific ways in which the Green's function values can be used vary depending on the application. The description below provides some example ways in which the Green's function values can be used. It should be noted, however, that these applications are examples only and that the Green's function values for a graph can be used in any other suitable manner to support various advanced computing-related functions.

In the description here, various values are described as being near-zero or close to zero. The definition of what constitutes a near-zero or close to zero value can vary depending on the application. In some embodiments, this value could be tunable by an end user, administrator, or other user in order to control the speed at which various calculations occur. This is because larger values can reduce the number of Green's function values calculated for a given graph, but it also allows some possible relationships between vertices to be missed. Conversely, smaller values can increase the number of Green's function values calculated for a given graph, but it also allows very weak possible relationships between vertices to be identified.

Although FIG. 2 illustrates one example of a method 200 for determining the relatedness of data using a graph to support machine learning, natural language parsing, search engine, or other functions, various changes may be made to FIG. 2. For example, while shown as a series of steps, various steps in FIG. 2 could overlap, occur in parallel, occur in a different order, or occur any number of times. As a particular example, it is possible that the calculation of the Green's function values can occur beforehand (such as before the graph is made available for use in machine learning, natural language parsing, search engine, or other applications). It is also possible that the calculation of the Green's function values can occur in real-time (such as during use of the graph in machine learning, natural language parsing, search engine, or other applications). Moreover, there may be no need in certain embodiments to normalize the graph in step 206, and the specific technique for calculating the Green's function values in step 208 is for illustration only. Any other suitable technique for calculating the Green's function values can be used, including those that generate Green's function values for all pairs of vertices in the graph or for any other suitable subset of pairs of vertices in the graph.

The approaches for measuring data relatedness that are described above can find use in many different types of applications. The following describes example ways in which the approaches described above can be used. However, the approaches described above can be used to support any suitable advanced computing-related functions, and this disclosure is not limited to the specific applications mentioned below.

Figure 3:
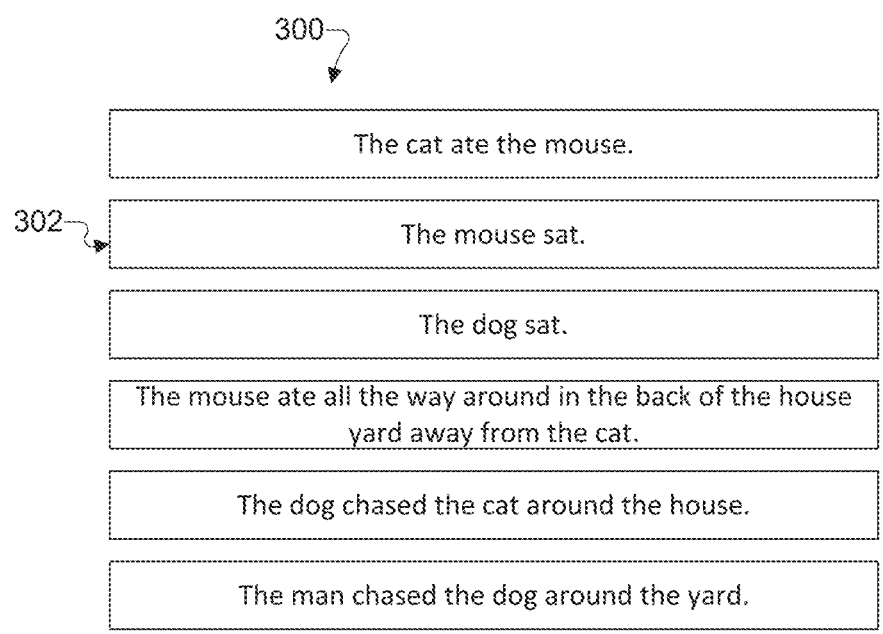
FIGS. 3 through 9 illustrate example uses for determining the relatedness of data using a graph according to this disclosure.
Figure 4:
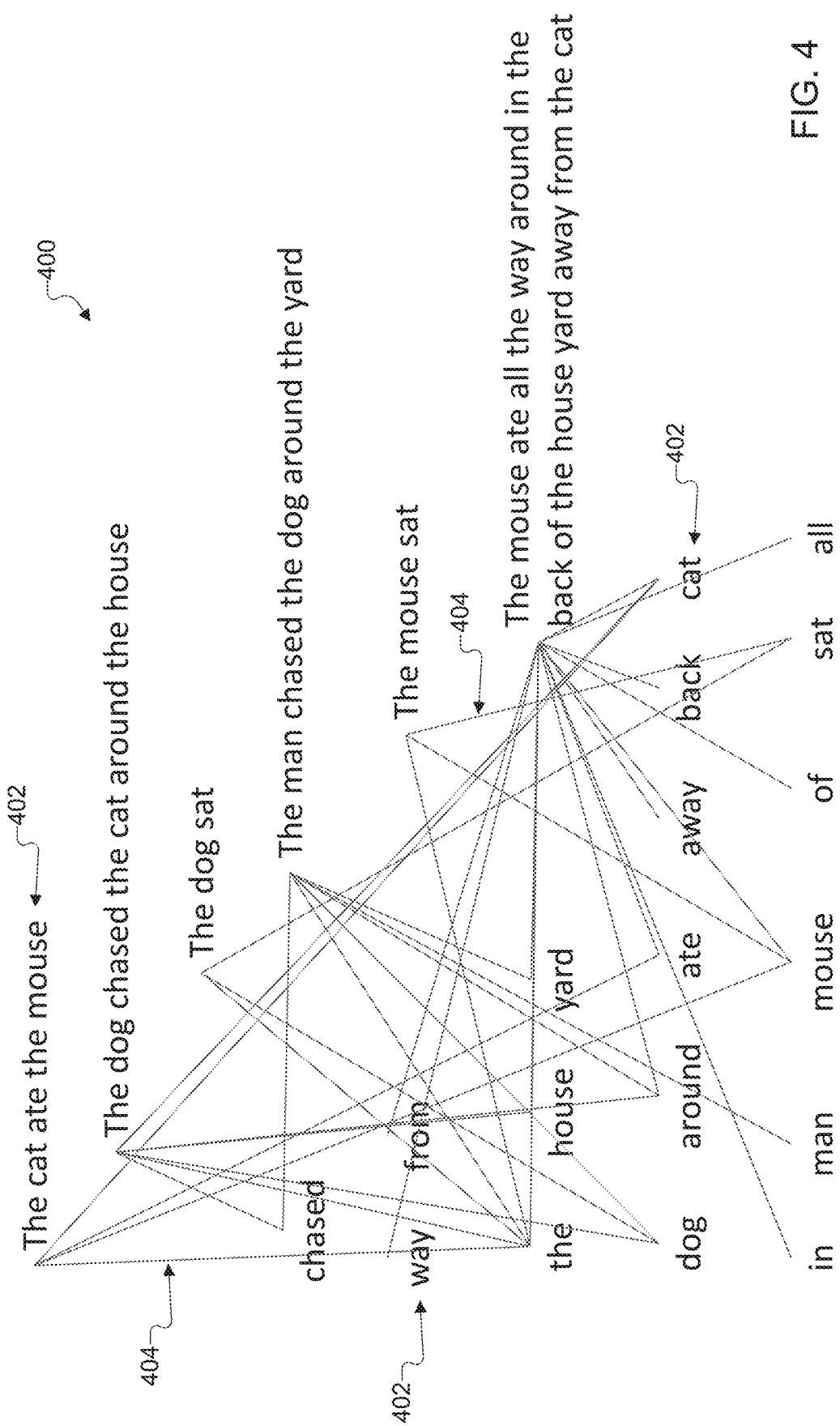
Figure 5:
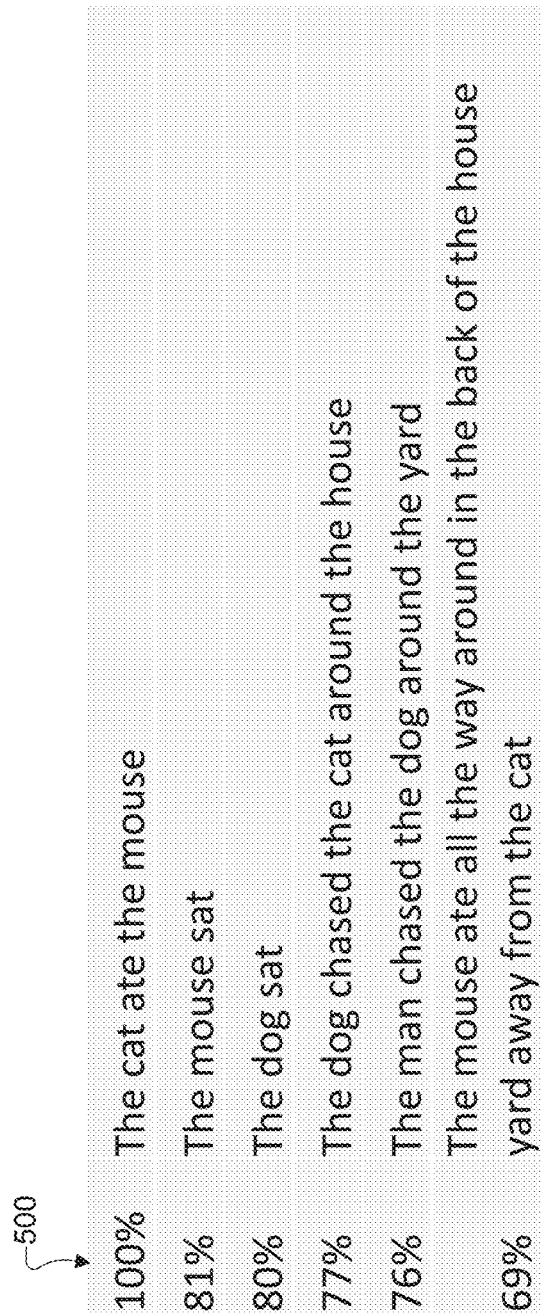
Figure 6:
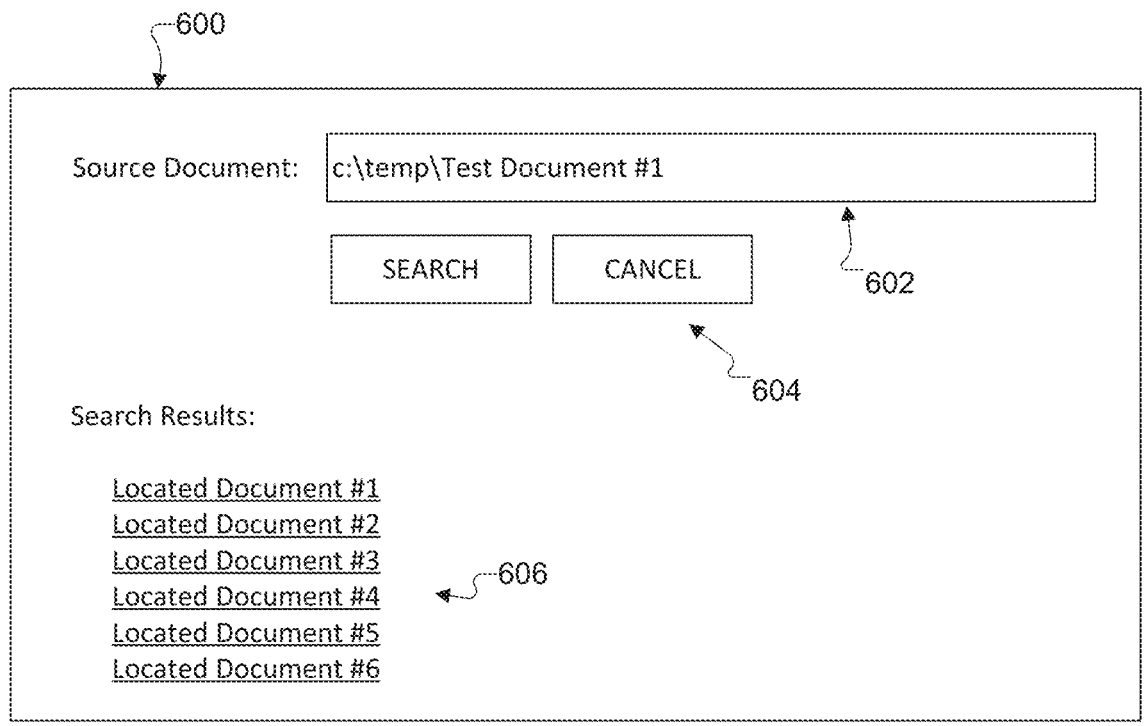
Figure 7:
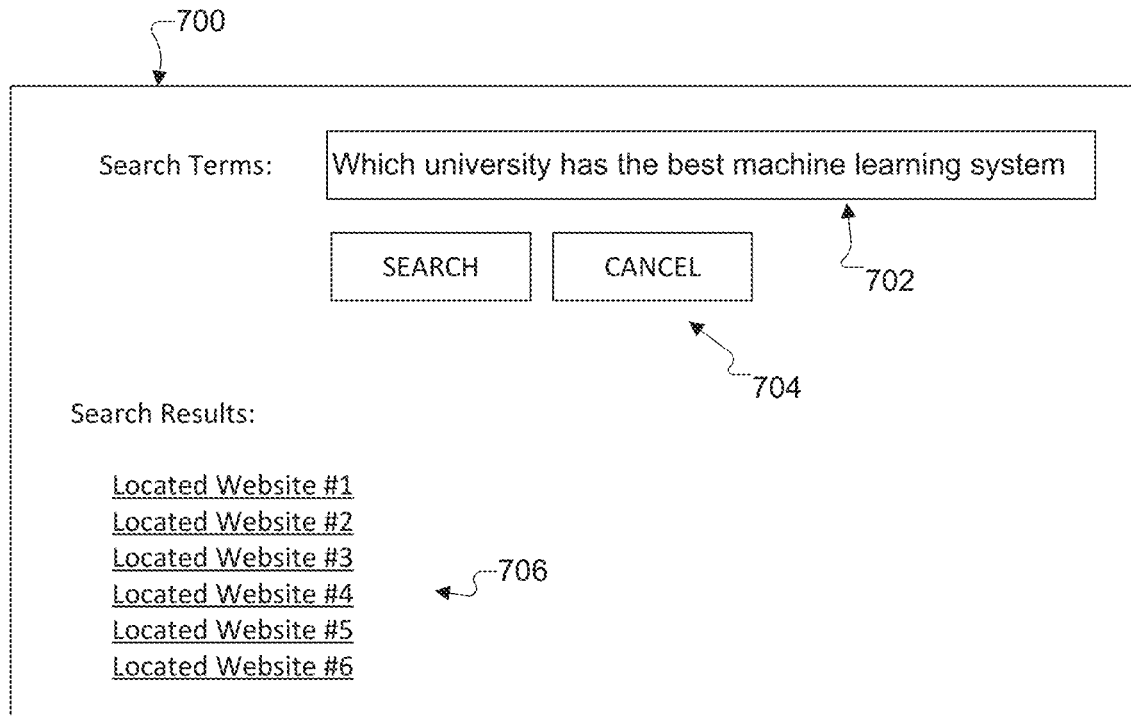
Figure 8:
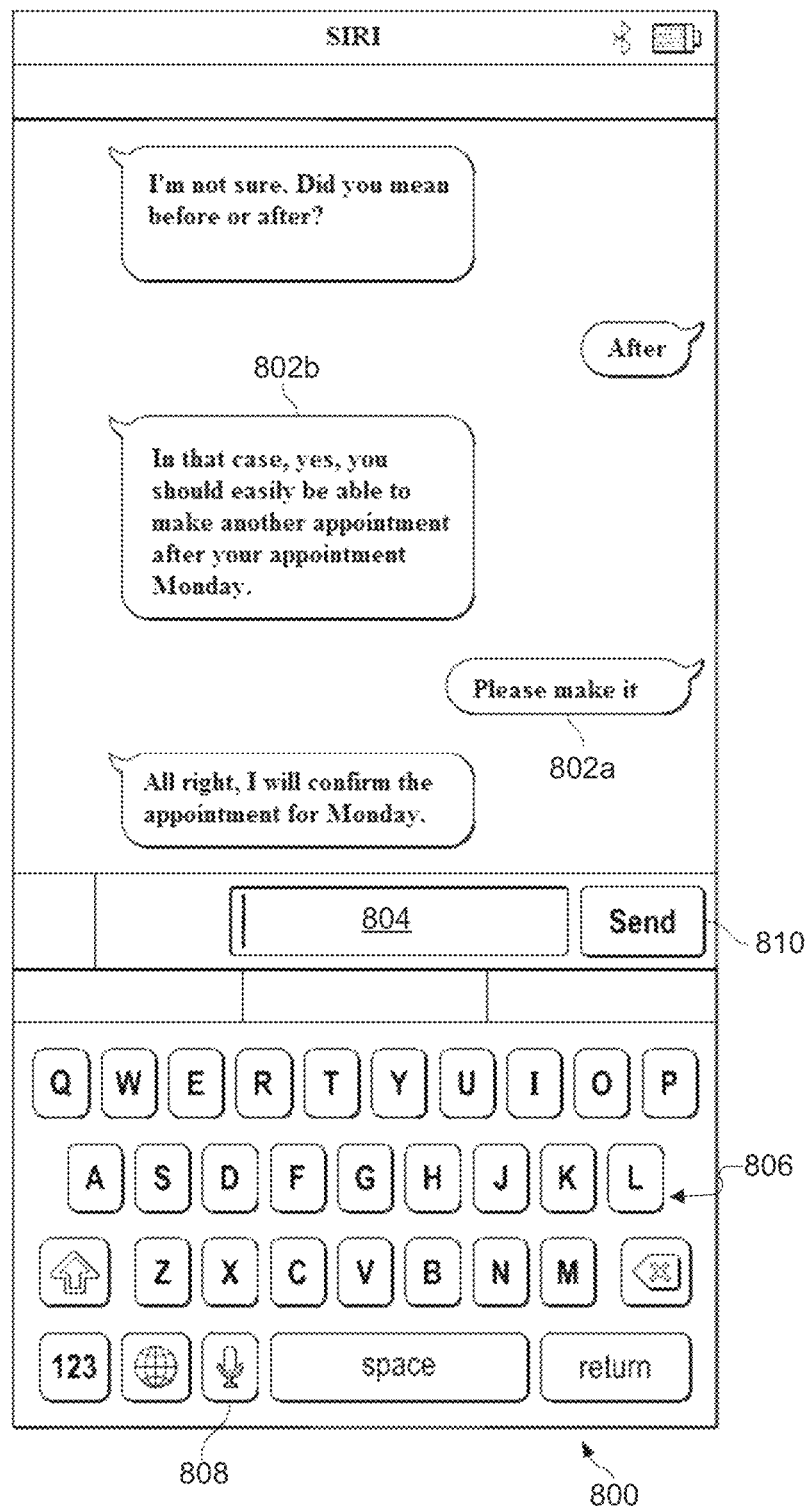
Figure 9:
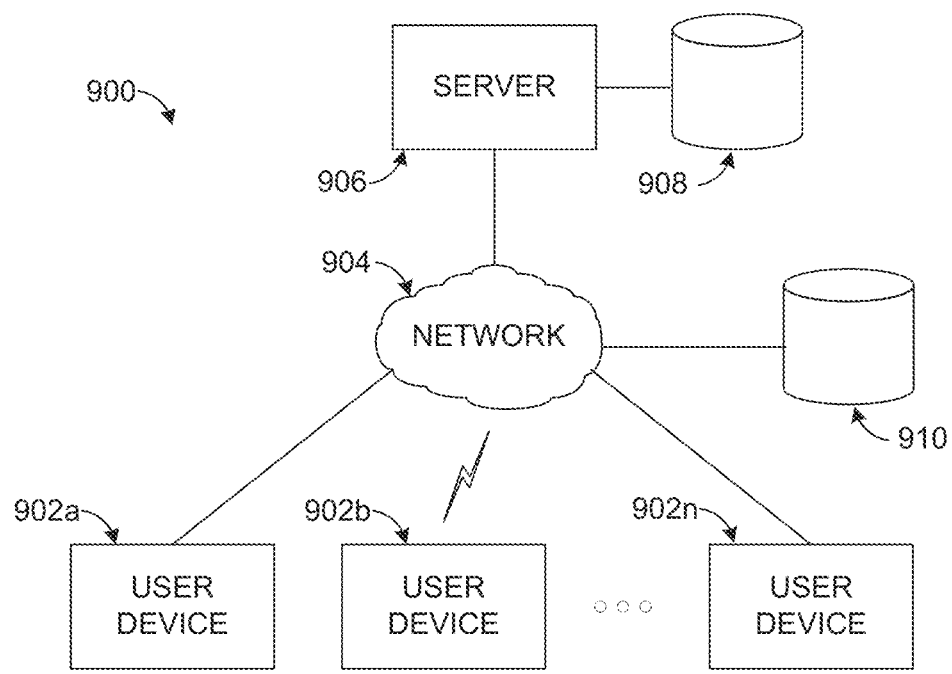

FIGS. 3 through 9 illustrate example uses for determining the relatedness of data using a graph according to this disclosure. In particular, FIG. 3 illustrates an example collection of data items to be analyzed, FIG. 4 illustrates an example graph generated using the collection of data items in FIG. 3, and FIG. 5 illustrates example relatedness values associated with the graph in FIG. 4. Also, FIGS. 6 through 8 illustrate example user interfaces that could be used with the results generated by the analysis of various data items, and FIG. 9 illustrates an example system in which the analysis of various data items can be supported.

One example use for the approaches described above is in content-based searching. For example, assume a user has a collection of documents and wishes to know which other documents in the collection are most closely related to a specified document. To implement this type of content-based searching, a machine learning algorithm can be applied to the collection of documents in order to build a graph in which the documents are included as some of the vertices. Words and phrases used in the documents can also be included as other vertices in the graph. Any suitable machine learning algorithm (now known or later developed) could be used here. The resulting graph could be a bipartite graph whose vertices are either documents or words/phrases, with edges indicating occurrences of the words/phrases in the documents. The graph could alternatively include syntactic parse trees of the documents, with vertices representing documents, phrases, and words and edges representing the inclusion of syntactic parts.

Using the approaches described above, the Green's function of the graph (or optionally a normalized version of the graph) can be calculated repeatedly for different vertices in the graph. Using the specific document as the diffusion "source," the search returns the other documents in the collection with the highest values of the Green's function. Documents with Green's function values that are objectively too high could be rejected as duplicates, although this need not be the case.

As a specific example of this functionality, consider FIGS. 3 through 5. FIG. 3 illustrates an example collection 300 of documents to be analyzed according to this disclosure. In FIG. 3, each document includes a single sentence 302. One example machine learning algorithm for generating a graph from a set of documents operates to form a bipartite graph whose (i) vertices include either documents or words in the documents and (ii) edges indicate the occurrences of words in the documents. FIG. 4 illustrates an example graph 400 generated using the collection 300 of documents in FIG. 3 according to this disclosure. The graph 400 here includes vertices 402 and edges 404 generated in this particular manner. In FIG. 4, the graph 400 is not normalized, but the graph 400 could be normalized as discussed above. The Green's function is computed with the source vertex being the document "the cat ate the mouse" and the evaporation rate being 0.1%. FIG. 5 illustrates example relatedness values 500 associated with the graph in FIG. 4 according to this disclosure. The first relatedness value is 100% because it is associated with the same phrase as the source vertex, while the other relatedness values decrease as the relatedness of the documents decrease.

In this example, it is interesting to compare the rankings of the documents "the dog sat" and "the mouse ate all the way around in the back of the house yard away from the cat." The first one ranks high even though the only common word with the source document is the word "the." This is because there is a chain of highly-related links ("the cat ate the mouse"→"the mouse sat"→"the dog sat") connecting them. The second one ranks low even though it contains every word of the source document. This is because the second one also contains a lot of completely unrelated information, which suggests that the true topic of that document is not closely related to the source document.

While the examples shown in FIGS. 3 through 5 have been simplified for ease of illustration and explanation, the approaches described here can be easily scaled to handle large numbers of documents or other content. Also, the content can be used to generate an extremely complex graph to represents the content and the words/phrases used in the content.

FIG. 6 illustrates an example user interface 600 that could be used with results generated by the analysis of various data items during this type of content-based searching. In this example, the user interface 600 includes a search box 602, which allows a user to identify a specific document. Any suitable mechanism can be used to identify the specific document. Example mechanisms include a text box allowing a user to type the file path to the specific document, a drag-and-drop mechanism allowing the user to drag the specific document from one window into the search box 602, or a pop-up window allowing the user to type or navigate to the appropriate file location. Search and cancel buttons 604 can be selected by the user to initiate or cancel a search for documents related to the specific document selected in the search box 602.

Once a search is initiated, the processor 102 can use the words and phrases in the specific document selected in the search box 602 to determine which other documents are most related. As described above, this can involve identifying which vertices associated with other documents are most related based on the Green's function values associated with the words and phrases in the specific document (which can be represented by at least one vertex in the graph). Documents identified as being relevant can be presented to the user via a list 606. In this example, each document in the list 606 could be identified using a name or other identifier, and a hyperlink can be provided to allow the user to select and view each identified document. While not shown here, at least a portion of each of the identified documents can optionally be presented in the list 606 so that the user can review at least part of each identified document (in order to determine whether it is relevant). Also, while not shown here, percentages or other indicators can optionally be used to identify different levels of relevance to the specific document selected in the search box 602.

Note that the approaches described above for content-based searching are not limited to use with searches based on document contents. Other uses are also possible, including (but not limited to) natural language searches or other natural language operations. For example, FIG. 7 illustrates an example user interface 700 that could be used with results generated by the analysis of various data items during natural language searching. In this example, the user interface 700 includes a search box 702, which allows a user to provide a natural language query. Any suitable mechanism can be used to provide a natural language query, such as a keyboard or a text-to-speech converter. Search and cancel buttons 704 can be selected by the user to initiate or cancel a search for websites or other content related to the natural language query.

Once a search is initiated, the processor 102 can use the words and phrases in the natural language query to determine which content identified in its graph is most related. As described above, this can involve identifying which vertices associated with content are most related based on the Green's function values associated with the words and phrases in the natural language query (which can be represented by at least one vertex in the graph). Content identified as being relevant can be presented to the user in a list 706. In this example, the identified content takes the form of various websites in the list 706, and a hyperlink can be provided to allow the user to select and view each identified website. While not shown here, at least a portion of each of the identified websites can optionally be presented in the list 706 so that the user can review at least part of each identified website (in order to determine whether it is relevant). Also, while not shown here, percentages or other indicators can optionally be used to identify different levels of relevance of each website to the natural language query provided in the search box 702.

Another example use of the technique shown in FIGS. 3 through 5 is natural language parsing or recognition, a specific example of which is illustrated in FIG. 8. As shown in FIG. 8, a mobile device interface 800 is being used to support voice/text interactions between a user and a virtual assistant. Here, interactions 802a represent voice/text comments provided by a user, and interactions 802b represent voice/text comments provided by the virtual assistant. In this example, the virtual assistant is the SIRI virtual assistant from APPLE, although other virtual assistants can be used (such as GOOGLE ASSISTANT from GOOGLE or CORTANA from MICROSOFT). A text box 804 can be used to display text that is being prepared for transmission to the virtual assistant. A virtual keyboard 806 or a voice dictation button 808 can be used to generate text in the text box 804. A send button 810 can be used by the user to transmit the text in the text box 804 to the virtual assistant. In this example, the processor 102 can use a graph to parse comments received from the user's mobile device and to generate suitable responses for the mobile device. Note, however, that this same approach can be used with other devices and is not limited to use with mobile devices.

FIG. 9 illustrates an example system 900 supporting content-based searching, natural language parsing, or other functions in accordance with this disclosure. As shown in FIG. 9, the system 900 includes multiple end user devices 902a-902n (which can be referred to individually or collectively as end user device or devices 902). The end user devices 902a-902n generally represent computing or communication devices that support interactions with users. Example end user devices 902a-902n can include desktop computers, laptop computers, tablet computers, mobile smartphones, and other "smart" devices. Each end user device 902a-902n typically includes at least one processor (such as the processor(s) 102) and at least one storage device (such as the storage device(s) 104).

At least one network 904 facilitates communication between various components, such as with the end user devices 902a-902n, in the system 900. For example, the network 904 may transport Internet Protocol (IP) packets or other suitable information between network addresses. The network 904 may include one or more local area networks, metropolitan area networks, wide area networks, all or a portion of a global network such as the Internet, or any other communication system(s) at one or more locations. Note that multiple networks 904 could also be used, such as when each end user device 902a-902n couples to the Internet via a local area network or wireless cellular network.

At least one server 906 supports various functions related to content-based searching, natural language parsing, or other functions involving graphs. Each server 906 typically includes at least one processor (such as the processor(s) 102) and at least one storage device (such as the storage device(s) 104). For example, a user using an end user device 902 could identify a specific document, which can be stored on the end user device 902, in a database 908 coupled to the server 906, in a database 910 accessible by the server 906, or other location. The server 906 could use a graph (which may be stored in the server 906, the database 908, or other location) to identify other documents that are most related to the specific document. The other documents could be stored on the end user device 902, in the database 908, in the database 910, or other location(s). The server 906 can report the results of the search to the end user device 902, such as in the form of hyperlinks in the user interface 600 presented within a web browser or other application or app of the end user device 902.

As another example, a user using an end user device 902 could provide a natural language query to the server 906, such as via a web browser. The server 906 could use a graph (which may be stored in the server 906, the database 908, or other location) to identify content this is most related to the natural language query. The content could represent websites, documents, or other content. The server 906 can report the results of the search to the end user device 902, such as in the form of hyperlinks in the user interface 700 presented within the web browser or other application or app of the end user device 902.

As yet another example, a user using an end user device 902 could interact with a virtual assistant that is supported or executed by the server 906. Messages from the end user device 902 can be provided to the server 906. The server 906 could use a graph (which may be stored in the server 906, the database 908, or other location) to parse the user's messages and identify proper responses to the user's messages. The server 906 can output the proper responses to the end user device 902, such as within the mobile device interface 800 presented within an app or other application of the end user device 902.

Although FIGS. 3 through 9 illustrate examples of uses for determining the relatedness of data using a graph, various changes may be made to FIGS. 3 through 9. For example, the text shown in FIGS. 3 through 5 is for illustration only, and any other suitable text or other content can be parsed or modeled as described above. Also, the interfaces shown in FIGS. 6 through 8 are for illustration only, and any other suitable interface can be used to provide data to or receive data from a server or other computing device that uses a graph to support functions such as machine learning, natural language parsing, search engine, or other functions. In addition, the system 900 is for illustration only, and a number of centralized and distributed architectures could be used for determining the relatedness of data using a graph.

Figure 10:
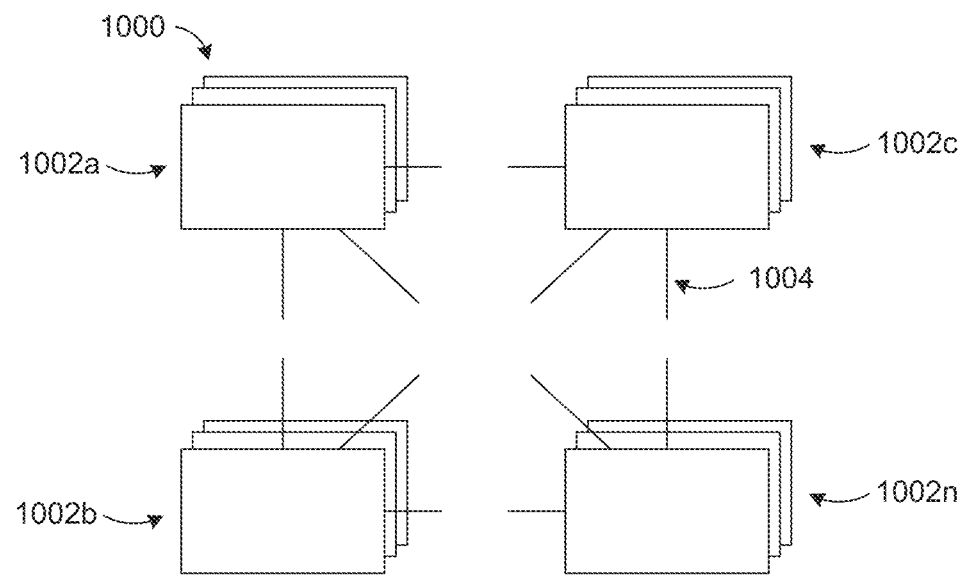
FIGS. 10 through 12 illustrate other example uses for determining the relatedness of data using a graph according to this disclosure.
Figure 11:
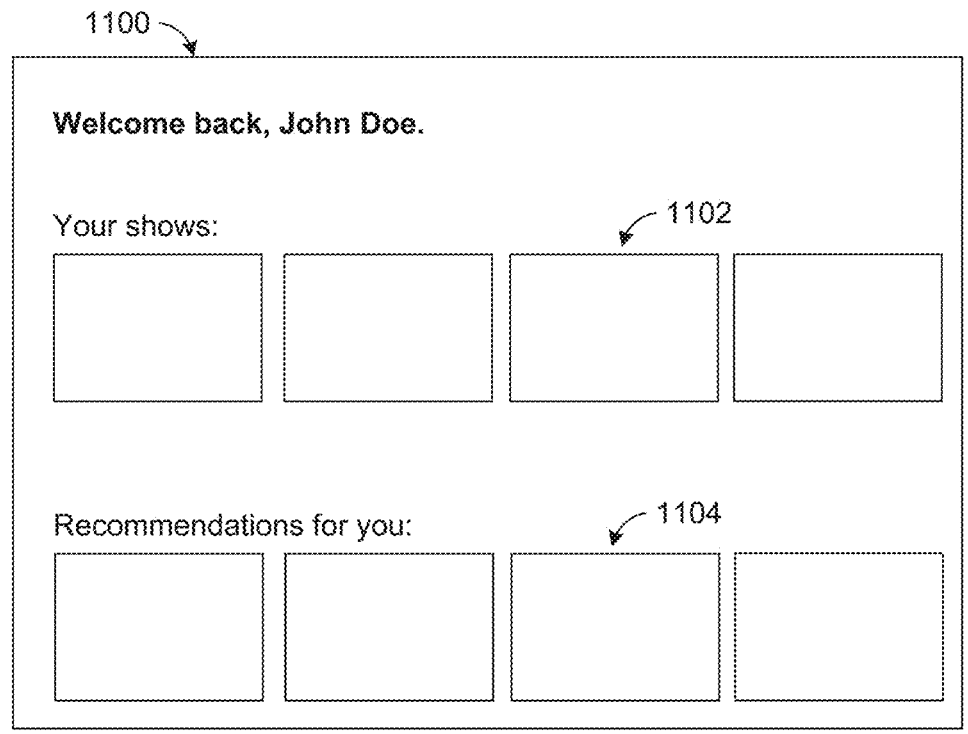
Figure 12:
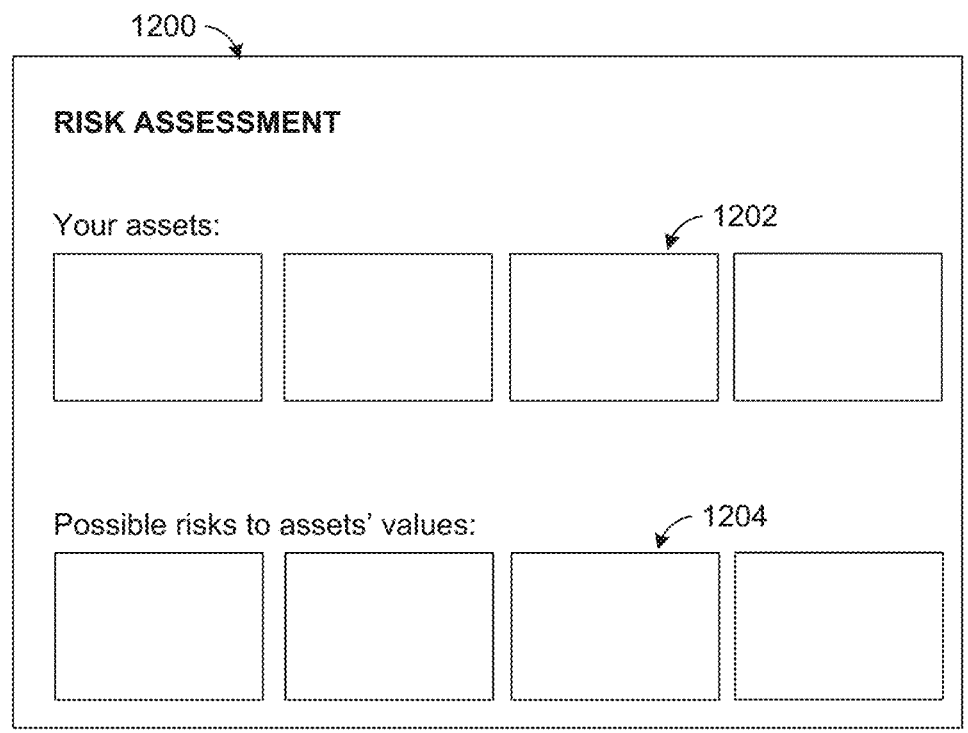

FIGS. 10 through 12 illustrate other example uses for determining the relatedness of data using a graph according to this disclosure. In particular, FIG. 10 illustrates an example graph generated using a collection of data items, and FIGS. 11 and 12 illustrate example user interfaces that could be used with results generated by the analysis of the collection of data items.

Another example use for the approaches described above is in making recommendations, such as for movies, television shows, or other entertainment content or for products or services. For example, assume a user has an account associated with entertainment content, such as a NETFLIX, HULU, TIVO, YOUTUBE, or AMAZON or AMAZON PRIME account. The user may have established a profile identifying likes or dislikes of the user from an entertainment perspective, or a content provider/content distributer may have generated a profile identifying likes or dislikes of the user (such as based on user feedback or based on the content that the user has previously viewed). To implement a recommendation system, a machine learning algorithm can be applied to build a graph in which different characteristics of content are included as some of the vertices. Other vertices can represent viewers or the viewers' profiles/preferences. Any suitable machine learning algorithm (now known or later developed) could be used here. With respect to movies or television shows, the resulting graph could be a bipartite graph whose vertices are movies or television shows, characters, actors, directors, plot devices, genres, or other movie or television-related knowledge (represented by vertices), with edges indicating associations of the movie or television-related knowledge with the movies or television shows. One or more additional vertices can be associated with one or more viewers (users) or the associated profiles.

Using the approaches described above, the Green's function of the graph (or optionally a normalized version of the graph) can be calculated repeatedly for different vertices in the graph. Using a specific viewer or profile's vertex as the diffusion "source," the search identifies vertices in the graph most closely related to the specific viewer or profile's vertex. These vertices can be used to identify characters, actors, directors, plot devices, genres, or other information and then movies or television shows that may be of interest to the viewer (and that the viewer may or may not have previously viewed).

As a specific example of this functionality, consider FIG. 10 in which a graph 1000 includes multiple sets of vertices 1002a-1002n and edges 1004. The different sets of vertices 1002a-1002n can be used to represent movies, television shows, or other content. The different sets of vertices 1002a-1002n can also be used to represent characters, actors, directors, plot devices, genres, or other content-related knowledge. The different sets of vertices 1002a-1002n can further be used to represent viewers (users) or their profiles. The edges 1004 can be used to associate characters, actors, directors, plot devices, genres, or other knowledge with movies, television shows, or other content and with viewers/profiles. Relatedness values can be generated in the manner described above to identify the relatedness between the different vertices, such as to associate characters, actors, directors, plot devices, genres, or other knowledge to movies, television shows, or other content and to associate these vertices with viewers/profiles.

While the example shown in FIG. 10 has been simplified for ease of illustration and explanation, the approaches described here can be easily scaled to handle large numbers of vertices. Also, an extremely complex graph can be generated to represent information associated with entertainment content or other information used to make recommendations to users.

FIG. 11 illustrates an example user interface 1100 that could be used with the results generated by the analysis of various data items in a recommendation-based search. In this example, the user interface 1100 includes a list of content items 1102 associated with the viewer. The content items 1102 may, for example, represent movies, television shows, or other content that the user has viewed previously or is in the process of viewing. The user interface 1100 also includes a list of recommended content items 1104 associated with the viewer. The recommended content items 1104 can be identified using the approaches described above and may represent movies, television shows, or other content that the viewer may be interested in viewing. In some embodiments, the recommended content items 1104 may represent content that the viewer has not previously viewed, although this need not be the case.

Note that the approaches described above for making recommendations are not limited to use with searches based on entertainment content. Other uses are also possible, including (but not limited to) other product or service recommendations and risk management applications. In general, any suitable product or service that can be represented in a graph could be recommended to a user.

Risk management generally involves generating probable future scenarios to understand their impacts on a portfolio of investments. Without any bias to what might happen in the future, the scenarios may be generated randomly. If there is some knowledge about events that may likely happen in the future, it may be preferable to weight scenarios that are causally related to the future events more heavily. For instance, if the vertices of a graph represent assets in a portfolio and possible future events, the edges of the graph can represent causal relationships between these items. In this example, the relatedness of the vertices represents the strength of the causal relationship between them. As a result, the strength of the causal relationship between a possible future event and a variety of portfolio assets (as determined by the relatedness values determined as described above) can be used to construct a risk scenario. In response to a risk scenario, an allocation of assets can be adjusted in accordance with the strength(s) of the causal relationship(s) between the possible future event(s) and the assets.

FIG. 12 illustrates an example user interface 1200 that could be used with the results generated by the analysis of various data items in a risk management-based search. In this example, the user interface 1200 includes a list of assets 1202. The assets 1202 may, for example, represent financial assets in a portfolio belonging to a user or to someone associated with the user (such as the user's client). The user interface 1200 also includes a list of possible risks 1204 to the value of the assets 1202. The possible risks 1204 can be identified using the approaches described above and may represent the most likely future events that could have an impact on the value of the assets 1202. While not shown here, the user interface 1200 can include options for triggering various functions, such as rebalancing of an asset portfolio in view of the identified risks. The rebalancing could be determined automatically, such as to reduce the identified risks.

In some embodiments, the same type of system 900 shown in FIG. 9 could be used to support these functions. For example, the end user devices 902a-902n could be used to receive movies, television shows, or other entertainment content from one or more servers 906. At least one of the servers 906 could have access to a graph containing information about the entertainment content and about the viewers' preferences. The server 906 could make recommendations to a viewer via the end user device 902, such as in the user interface 1100 presented within a web browser or other application or app of the end user device 902. The same or similar type of process could occur using different user profiles or different products or services.

As another example, the end user devices 902a-902n could be used to manage or review financial-related information held at one or more servers 906. At least one of the servers 906 could have access to a graph containing information about users' financial assets and future events that could affect the value of those assets. The server 906 could generate risk scenarios to identify likely future events that can impact the value of those assets and provide related information to the end user device 902, such as in the user interface 1200 presented within a web browser or other application or app of the end user device 902.

Although FIGS. 10 through 12 illustrate other examples of uses for determining the relatedness of data using a graph, various changes may be made to FIGS. 10 through 12. For example, the interfaces shown in FIGS. 11 and 12 are for illustration only, and any other suitable interface can be used to provide data to or receive data from a server or other computing device that uses a graph to support functions such as machine learning, natural language parsing, search engine, or other functions.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A computer-implemented method comprising:
obtaining a graph comprising vertices that represent items and edges that represent relationships between the items;
using at least one processor, identifying pairwise relatedness values associated with pairs of vertices in the graph, wherein each pairwise relatedness value is determined as a measure of diffusion on a space in the graph with a first vertex acting as a diffusion source and a boundary acting as a diffusion sink such that a diffusion density at a second vertex defines the pairwise relatedness value associated with the first and second vertices; and
performing, by the at least one processor, at least one of machine learning, natural language parsing, or a search via a search engine using the pairwise relatedness values as a measure of how the items associated with the pairs of vertices in the graph are related to one another;
wherein identifying the pairwise relatedness values comprises using a boundary condition that defines the boundary on the space in the graph around the diffusion source, wherein vertices outside the boundary are assumed to have a pairwise relatedness value of zero with respect to the diffusion source; and
wherein the measure of diffusion for each pairwise relatedness value is determined as an approximation of the Green's function of a discrete Laplacian of the graph by, for each of multiple vertices acting as the diffusion source, (i) using a moving wavefront around the diffusion source as a boundary and (ii) stopping movement of the wavefront when the Green's function value or its derivative at the wavefront reaches a specific threshold.

2. The method of claim 1, wherein:
some vertices in the graph represent documents;

other vertices in the graph represent words or phrases in the documents;

identifying the pairwise relatedness values comprises identifying, for a specific source document, pairwise relatedness values for other documents that might be related to the words or phrases in the source document; and using the pairwise relatedness values comprises performing the search to identify and output an identification of one or more of the other documents that are most closely related to the source document.

3. The method of claim 1, wherein:

some vertices in the graph represent available content;

other vertices in the graph represent words or phrases in the available content;

identifying the pairwise relatedness values comprises identifying, for a specific natural language query, pairwise relatedness values for the content that might be related to words or phrases in the natural language query; and using the pairwise relatedness values comprises performing the search to identify and output an identification of the content that is most closely related to the natural language query.

4. The method of claim 1, wherein:

some vertices in the graph represent products or services and related aspects of the products or services;

other vertices in the graph represent users or profiles of the users;

identifying the pairwise relatedness values comprises identifying, for a specific user or the specific user's profile, pairwise relatedness values for the products or services that might be recommended to the specific user; and using the pairwise relatedness values comprises performing the search to identify and output an identification of the products or services to be recommended for the specific user.

5. The method of claim 1, wherein:

at least some vertices in the graph represent words or phrases;

identifying the pairwise relatedness values comprises identifying pairwise relatedness values for the words or phrases that might be related to one another; and using the pairwise relatedness values comprises performing the natural language parsing using the graph.

6. The method of claim 1, wherein:

at least some vertices in the graph represent assets in a portfolio and possible future events;

identifying the pairwise relatedness values comprises identifying which future events might have an impact on a value of the assets; and using the pairwise relatedness values comprises using the pairwise relatedness value between a specific one of the events and a specific one of the assets to weight an impact of the specific event on the specific asset in a risk management scenario.

7. The method of claim 1, wherein the boundary condition defines a surface at which the diffusion density is zero and a normal derivative of the diffusion density equals a second threshold.

8. The method of claim 1, wherein the edges of the graph are weighted.

9. The method of claim 8, wherein a weight of a specific one of the edges between first and second specified vertices in the graph is determined using a formula of:

$$1/\max(\deg(v)^{1/p}, \deg(w)^{1/p})$$

where:

v denotes the first specified vertex in the graph;

w denotes the second specified vertex in the graph;

deg(v) denotes an unweighted degree of the first specified vertex in the graph;

deg(w) denotes an unweighted degree of the second specified vertex in the graph; and p is a positive number.

10. An apparatus comprising:

at least one processor configured to:

obtain a graph comprising vertices that represent items and edges that represent relationships between the items;

identify pairwise relatedness values associated with pairs of vertices in the graph, wherein each pairwise relatedness value is determined as a measure of diffusion on a space in the graph with a first vertex acting as a diffusion source and a boundary acting as a diffusion sink such that a diffusion density at a second vertex defines the pairwise relatedness value associated with the first and second vertices; and perform at least one of machine learning, natural language parsing, or a search via a search engine using the pairwise relatedness values as a measure of how the items associated with the pairs of vertices in the graph are related to one another;

wherein, to identify the pairwise relatedness values, the at least one processor is configured to use a boundary condition that defines the boundary on the space in the graph around the diffusion source, wherein vertices outside the boundary are assumed to have a pairwise relatedness value of zero with respect to the diffusion source; and wherein the at least one processor is configured to determine the measure of diffusion for each pairwise relatedness value as an approximation of the Green's function of a discrete Laplacian of the graph by, for each of multiple vertices acting as the diffusion source, (i) using a moving wavefront around the diffusion source as a boundary and (ii) stopping movement of the wavefront when the Green's function value or its derivative at the wavefront reaches a specific threshold.

11. The apparatus of claim 10, wherein:

some vertices in the graph represent documents;

other vertices in the graph represent words or phrases in the documents;

to identify the pairwise relatedness values, the at least one processor is configured to identify, for a specific source document, pairwise relatedness values for other documents that might be related to the words or phrases in the source document; and to use the pairwise relatedness values, the at least one processor is configured to perform the search to identify and output an identification of one or more of the other documents that are most closely related to the source document.

12. The apparatus of claim 10, wherein:

some vertices in the graph represent available content;

other vertices in the graph represent words or phrases in the available content;

to identify the pairwise relatedness values, the at least one processor is configured to identify, for a specific natural language query, pairwise relatedness values for the content that might be related to words or phrases in the natural language query; and to use the pairwise relatedness values, the at least one processor is configured to perform the search to identify and output an identification of the content that is most closely related to the natural language query.

13. The apparatus of claim 10, wherein:
some vertices in the graph represent products or services and related aspects of the products or services;
other vertices in the graph represent users or profiles of the users;
to identify the pairwise relatedness values, the at least one processor is configured to identify, for a specific user or the specific user's profile, pairwise relatedness values for the products or services that might be recommended to the specific user; and
to use the pairwise relatedness values, the at least one processor is configured to perform the search to identify and output an identification of the products or services to be recommended for the specific user.

14. The apparatus of claim 10, wherein:
at least some vertices in the graph represent words or phrases;
to identify the pairwise relatedness values, the at least one processor is configured to identify pairwise relatedness values for the words or phrases that might be related to one another; and
to use the pairwise relatedness values, the at least one processor is configured to perform the natural language parsing using the graph.

15. The apparatus of claim 10, wherein:
at least some vertices in the graph represent assets in a portfolio and possible future events;
to identify the pairwise relatedness values, the at least one processor is configured to identify which future events might have an impact on a value of the assets; and
to use the pairwise relatedness values, the at least one processor is configured to use the pairwise relatedness value between a specific one of the events and a specific one of the assets to weight an impact of the specific event on the specific asset in a risk management scenario.

16. The apparatus of claim 10, wherein the boundary condition defines a surface at which the diffusion density is zero and a normal derivative of the diffusion density equals a second threshold.

17. The apparatus of claim 10, wherein the edges of the graph are weighted.

18. The apparatus of claim 17, wherein a weight of a specific one of the edges between first and second specified vertices in the graph is determined using a formula of:

$$1/\max(\deg(v)^{1/p}, \deg(w)^{1/p})^{1/p}$$

where:
v denotes the first specified vertex in the graph;
w denotes the second specified vertex in the graph;
deg(v) denotes an unweighted degree of the first specified vertex in the graph;
deg(w) denotes an unweighted degree of the second specified vertex in the graph; and
p is a positive number.

19. A non-transitory computer readable medium containing instructions that when executed cause at least one processor to:
obtain a graph comprising vertices that represent items and edges that represent relationships between the items;
identify pairwise relatedness values associated with pairs of vertices in the graph, wherein each pairwise relatedness value is determined as a measure of diffusion on a space in the graph with a first vertex acting as a diffusion source and a boundary acting as a diffusion sink such that a diffusion density at a second vertex defines the pairwise relatedness value associated with the first and second vertices; and
perform at least one of machine learning, natural language parsing, or a search via a search engine using the pairwise relatedness values as a measure of how the items associated with the pairs of vertices in the graph are related to one another,
wherein the instructions that when executed cause the at least one processor to identify the pairwise relatedness values comprise instructions that when executed cause the at least one processor to use a boundary condition that defines the boundary on the space in the graph around the diffusion source, wherein vertices outside the boundary are assumed to have a pairwise relatedness value of zero with respect to the diffusion source; and
wherein the instructions when executed cause the at least one processor to determine the measure of diffusion for each pairwise relatedness value as an approximation of the Green's function of a discrete Laplacian of the graph by, for each of multiple vertices acting as the diffusion source, (i) using a moving wavefront around the diffusion source as a boundary and (ii) stopping movement of the wavefront when the Green's function value or its derivative at the wavefront reaches a specific threshold.

20. The non-transitory computer readable medium of claim 19, wherein:
some vertices in the graph represent documents;
other vertices in the graph represent words or phrases in the documents;
the instructions that when executed cause the at least one processor to identify the pairwise relatedness values comprise instructions that when executed cause the at least one processor to identify, for a specific source document, pairwise relatedness values for other documents that might be related to the words or phrases in the source document; and
the instructions that when executed cause the at least one processor to use the pairwise relatedness values comprise instructions that when executed cause the at least one processor to perform the search to identify and output an identification of one or more of the other documents that are most closely related to the source document.

21. The non-transitory computer readable medium of claim 19, wherein:
some vertices in the graph represent available content;
other vertices in the graph represent words or phrases in the available content;
the instructions that when executed cause the at least one processor to identify the pairwise relatedness values comprise instructions that when executed cause the at least one processor to identify, for a specific natural language query, pairwise relatedness values for the content that might be related to words or phrases in the natural language query; and
the instructions that when executed cause the at least one processor to use the pairwise relatedness values comprise instructions that when executed cause the at least one processor to perform the search to identify and output an identification of the content that is most closely related to the natural language query.

22. The non-transitory computer readable medium of claim 19, wherein:
- some vertices in the graph represent products or services and related aspects of the products or services;
- other vertices in the graph represent users or profiles of the users;
- the instructions that when executed cause the at least one processor to identify the pairwise relatedness values comprise instructions that when executed cause the at least one processor to identify, for a specific user or the specific user's profile, pairwise relatedness values for the products or services that might be recommended to the specific user; and
- the instructions that when executed cause the at least one processor to use the pairwise relatedness values comprise instructions that when executed cause the at least one processor to perform the search to identify and output an identification of the products or services to be recommended for the specific user.

23. The non-transitory computer readable medium of claim 19, wherein:
- at least some vertices in the graph represent words or phrases;
- the instructions that when executed cause the at least one processor to identify the pairwise relatedness values comprise instructions that when executed cause the at least one processor to identify pairwise relatedness values for the words or phrases that might be related to one another; and
- the instructions that when executed cause the at least one processor to use the pairwise relatedness values comprise instructions that when executed cause the at least one processor to perform the natural language parsing using the graph.

24. The non-transitory computer readable medium of claim 19, wherein:
- at least some vertices in the graph represent assets in a portfolio and possible future events;
- the instructions that when executed cause the at least one processor to identify the pairwise relatedness values comprise instructions that when executed cause the at least one processor to identify which future events might have an impact on a value of the assets; and
- the instructions that when executed cause the at least one processor to use the pairwise relatedness values comprise instructions that when executed cause the at least one processor to use the pairwise relatedness value between a specific one of the events and a specific one of the assets to weight an impact of the specific event on the specific asset in a risk management scenario.

25. The non-transitory computer readable medium of claim 19, wherein the boundary condition defines a surface at which the diffusion density is zero and a normal derivative of the diffusion density equals a second threshold.

\* \* \* \* \*